United States Patent [19]

Michal et al.

[11] Patent Number: 4,789,241

[45] Date of Patent: Dec. 6, 1988

[54] OPTICAL FIBER SENSING SYSTEMS HAVING ACOUSTICAL OPTICAL DEFLECTION AND; MODULATION DEVICES

[75] Inventors: Ronald J. Michal, Orange; Eric Udd, Huntington Beach; Richard F. Cahill, El Toro, all of Calif.

[73] Assignee: McDonnell Douglas Corporation, Long Beach, Calif.

[21] Appl. No.: 17,691

[22] Filed: Feb. 24, 1987

[51] Int. Cl.⁴ .............................................. G01B 9/02
[52] U.S. Cl. ..................................... 356/350; 350/358
[58] Field of Search ........................ 356/350; 350/358

[56] References Cited

U.S. PATENT DOCUMENTS 4,381,887 5/1983 Guerin .

FOREIGN PATENT DOCUMENTS 8301303 4/1983 PCT Int'l Appl. ................ 356/350

Primary Examiner—Vincent P. McGraw
Assistant Examiner—S. A. Turner
Attorney, Agent, or Firm—Benjamin Hudson, Jr.; George W. Finch; John P. Scholl

[57] ABSTRACT

There is provided by this invention an optical sensing system utilizing a Sagnac interferometer having a frequency shifter within the Sagnac counterpropagating loop that is generally comprised of a plurality of acoustic transducers mounted on acousto-optical material to frequency shift and beamsplit a light beam simultaneously within the material while at the same time having the capability of switching between an upshifted or downshifted frequency in either a Bragg or Raman-Nath mode of operation without realigning the optical beams. The acousto-optical material has a special configuration to eliminate back reflections of the acoustic waves that can interact with the light beam. In addition, special alignment of the transducers with dampening configurations also serves to prevent back reflections of the acoustic wave from interacting with the light beam.

10 Claims, 5 Drawing Sheets

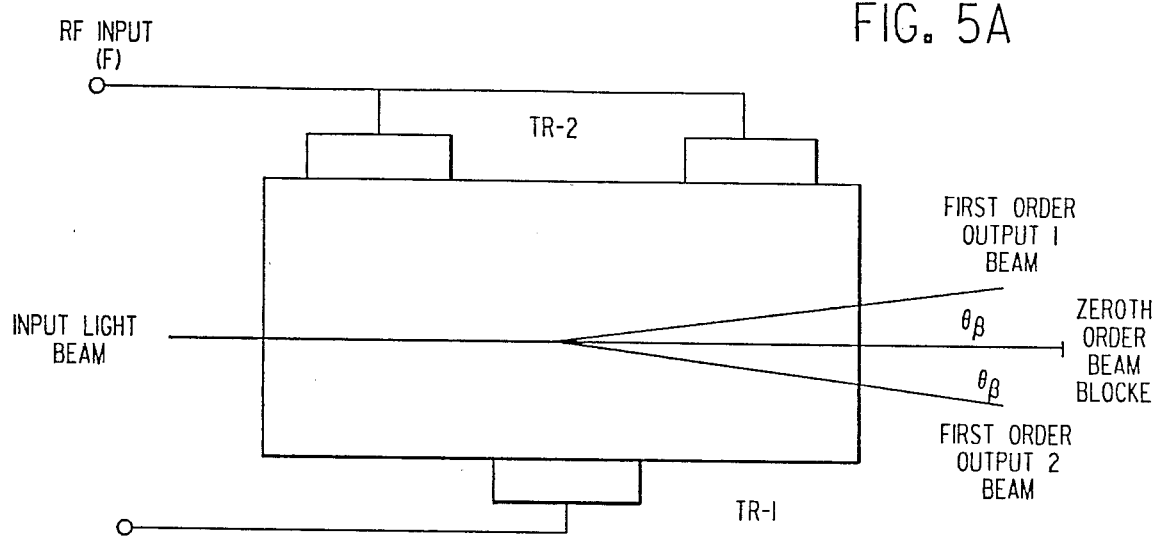
FIG. 5A
| TRANSDUCER ARRAY STATUS | | FIRST ORDER OUTPUT BEAMS FREQ. SHIFT | |
| --- | --- | --- | --- |
| TR-1 | TR-2 | 1 | 2 |
| ON | OFF | +F | -F |
| OFF | ON | -F | +F |
FIG. 5B
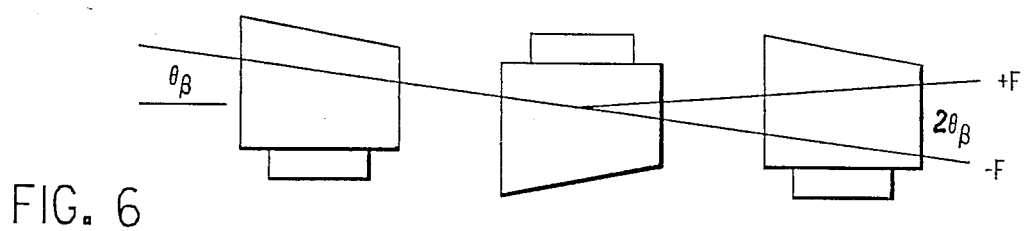
FIG. 6

OPTICAL FIBER SENSING SYSTEMS HAVING ACOUSTICAL OPTICAL DEFLECTION AND; MODULATION DEVICES

The Government has rights in this invention pursuant to Contract No. F33615-85-C-1835 awarded by the Department of the Air Force.

BACKGROUND OF THE INVENTION

1. Field of the Invention

This invention relates generally to fiber optic interferometer sensing systems that utilize the Sagnac interferometer having counterpropagating light beams, and more particularly to Sagnac interferometer sensing apparatus that utilize frequency shifters to provide a phase shift between the counterpropagating light beams to offset and null out nonreciprocal phase shifts induced by environmental factors.

2. Description of the Prior Art

In recent times the Sagnac interferometer utilizing counterpropagating light beams for sensing environmental factors that induce a nonreciprocal phase shift in the counterpropagating light beams has found various applications such as in acoustic sensors, temperature and pressure sensors, and more commonly optical gyros. Phase nulling fiber optic gyros, have been disclosed in the article, "Phase Nulling Fiber Optic Laser Gyro," *Optic Letters*, Volume 4, page 93, March, 1979, by R. F. Cahill and E. Udd; "Solid State Phase Nulling Optical Gyro," *Applied Optics*, Volume 19, page 3054, Sept. 15, 1980, by R. F. Cahill and E. Udd; and "Techniques for Shock-Noise-Limited-Inertia Rotation Measurement Using a Multiterm Fiber Sagnac Interferometer" by J. L. Davis and S. Ezekiel, Dec. 13, 1978, in *SPIE*, Volume 157. These papers disclose early fiber optic gyros which, although were known to operate, had not yet been involved in the intensive development required to bring a concept to practical use. Problems inherent in ring laser gyros were bypassed by adopting passive cavity techniques and applying fiber optics. Nonlinear analog outputs of prior art fiber optic gyros, which otherwise limit their dynamic range to a much lower level than that achieved by ring laser gyros are circumvented by using the phase nulling concept of Cahill and Udd disclosed in U.S. Pat. No. 4,299,490 for phase nulling optical gyro.

SUMMARY OF THE INVENTION

There is provided by this invention a Sagnac interferometer optical system that performs frequency shifting for offsetting and nulling out nonreciprocal phase shifts in the system utilizing a frequency shifter comprised of an acoustic optic material having multiple arrays of transducers arranged on opposite sides of the material. The multiple array of transducers is connected to an r.f. input through a switching circuit to control the direction the acoustic waves travel across the device such that it interacts with the light beam for modulation at the Bragg angle. The acoustic optic material has a special configuration to eliminate back reflections of the acoustic waves that can interact with the light beam which use a special alignment of the transducers with dampening configurations to prevent back reflections of the acoustic wave from interacting with the light beam. Another embodiment of device uses beam steering utilizing time delay circuitry. All the embodiments provide a means to localize the frequency shifting and beamsplitting functions at the same point in the acousto-optic modulators used in a fiber optic sensor.

Two spatially separable light beams are generated in the device. The relative frequencies of the light beams are controlled by the device. These beams serve as the counterpropagating light beams in the Sagnac fiber optic sensor.

These embodiments have the capability to reverse the frequency shift of the counterpropagating light beams by switching from an array or set of transducers on one side of the device to an array or set of transducers on the opposite side of the device.

BRIEF DESCRIPTION OF THE DRAWINGS

FIG. 5 illustrates how the embodiment described in FIGS. 2 and 3 is used in the Raman-Nath mode of operation;

FIG. 6 illustrates how three conventional acousto-optic modulators can be used to obtain an operation similar to the embodiment described in FIGS. 2 and 3.

BRIEF DESCRIPTION OF THE PREFERRED EMBODIMENT

Figure 1:
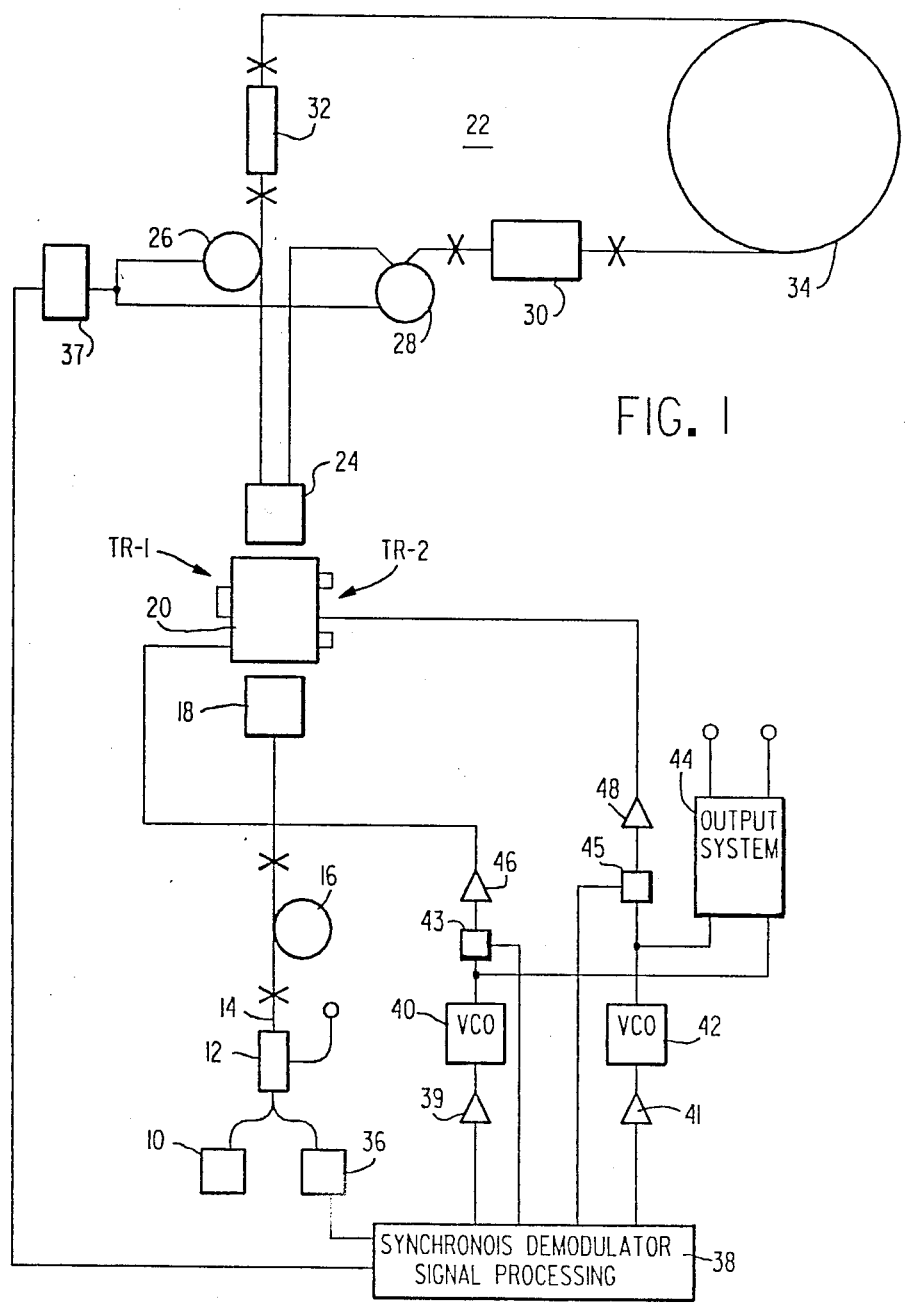
FIG. 1 illustrates a phase nulling optical gyro utilizing the principles of this invention.

Referring to FIG. 1 there is shown a Sagnac phase nulling optical gyro that incorporates the principles of this invention. The phase nulling optical gyro herein described is generally of the type described in the U.S. Pat. No. 4,299,490 entitled "Phase Nulling Optical Gyro Issued on Nov. 10, 1981," and U.S. Pat. No. 4,588,296 entitled "Improved Compact Gyro." Inasmuch as the phase nulling optical gyro is of the type disclosed in the aforementioned applications, to which reference is made for complete description of structure and operation, the description herein is limited to those portions essential to the operation of this invention.

Light from a light source 10 is introduced into the system through a fiber optic beamsplitter 12 which serves as an input/output coupler. Light passes through the fiber 14 from the beamsplitter 12 to a fiber polarizer 16 where it is then polarized. A graded index lens 18 is connected to the fiber polarizer 16 which collimates the light from the fiber and directs it into the acousto-optic frequency shifter 20. Two light beams exit the modulator 20, one upshifted in frequency by +F the input drive frequency of the device, and the other remains at the frequency of the input beam. The upshifted beam is directed into one end of a fiber loop 22, while the nonshifted beam is directed into the other end. This is accomplished by a dual in-line coupler lens combination 24. Within the fiber optic loop 22, two sections of fiber are wrapped around piezoelectric mandrils used to phase modulate the light for detection purposes. When the phase modulators are placed at the opposite ends of the Sagnac fiber loop 22 equidistant from the modulator 20, a signal waveform that is applied to both phase modulators, but with 180° phase difference, will cause the net modulation to be the sum of the amplitudes of the two phase modulators. Conversely, a signal waveform that is applied to both phase modulators and in phase will cause the net modulation to be the difference of the amplitudes of the two phase modulators. For example, if the two modulators were driven in phase with equal amplitudes, the two modulations would exactly cancel and produce no net phase modulation of the returning light output through the coupler 18, the polarizer 16, the beamsplitter 12 to a detector 36. This effect is what allows cancellation of the environmental noise that undesirably excite the two modulators. When the two phase modulators are mounted in close proximity with a symmetrical mounting, temperature changes will affect both modulators with nearly equal amplitudes and be in phase and thus cancel to a high degree. The same occurs for mechanical and acoustical vibrations.

Each of the counterpropagating light beams pass around the piezoelectric mandril and then into a polarization scramblers 30 and 32 which are used to prevent signal fade out due to thermally induced changes in the polarization state of the beams. The scramblers 30 and 32 may be two sections of polarization preserving fibers oriented 45° with respect to each other. Both beams then travel in counterpropagating directions through the fiber optic sensing coil 34 and then follow the reverse path back to the frequency shifter 20 where the shifted beam passes through unaffected, and the non-shifted beam becomes upshifted by the excitation frequency $+F$. Both beams are then recombined and coupled into the fiber by the graded index lens 18. The beams are then directed by the fiber beamsplitter 12 to the detector 36.

The phase modulator driver 37 also serves as a local oscillator for the synchronous demodulator and signal processor 38. In the absence of rotation or other nonreciprocal effect, only a second harmonic of the phase modulator drive frequency appears on the detector 36. When a rotation or other nonreciprocal effect is experienced, a first harmonic signal will be generated. The synchronous demodulator and signal processor 38 is used to measure the first harmonic and adjust voltage control oscillators 40 and 42 through action of the integrators 39 and 41. The synchronous demodulator and signal processor 38 switches at some frequency between the transducer arrays TR-1 and TR-2 through the action of electronic switches 43 and 45. This is done to insure only one transducer is activated at a time. The voltage control oscillator supplies an output to a output system 44 and supplies an adjusted signal to the frequency shifter 20 through the r.f. amplifiers 46 and 48. The frequency of the acousto-optic modulator 20 is adjusted to null out phase shifts due to rotation.

With the transducer array TR-1 on and array TR-2 off, the output beam coupled to the clockwise direction of the fiber coil is upshifted while the beam coupled to the counterclockwise fiber coil leg is non-shifted. When transducer array TR-2 is turned on and TR-1 is turned off, the beam becomes downshifted in the clockwise leg of the fiber coil and the beam coupled into the counterclockwise leg of the fiber coil remains non-shifted. In this case, a single beam is split into two output beams thus eliminating a need for a central beamsplitter in the configuration shown. The purpose for switching between TR-1 and TR-2 is to enable the Sagnac interferometer to measure rotation or other environmental effects and scale factor to high accuracy such as one part per million. When TR-1 is turned on, the frequency shift corresponds to some $+F$, such as $+80$ MHz plus the frequency needed to null out the environmentally induced phase shift fc.

Alternatively when TR-2 is turned on, the frequency shift corresponds to some $-F$, such as $-80$ MHz, plus the nulling frequency F. Adding the two outputs together and dividing by two yields the frequency F which is proportional to the rotation rate or nonreciprocal effect. If the constant of proportionality referred to as the scale factor changes, then the outputs for TR-1 and TR-2 become $F + F_1$, and $-F - F_1$, respectively. By tracking the change in the difference of the two outputs, the scale factor can be determined to high accuracy.

Figure 2:
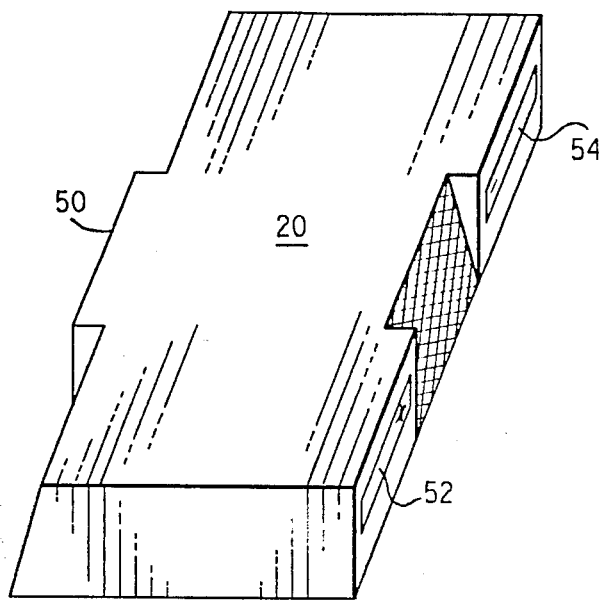
FIG. 2 illustrates a perspective view of the frequency shifter incorporating the principles of this invention as described in FIG. 1.
Figure 3:
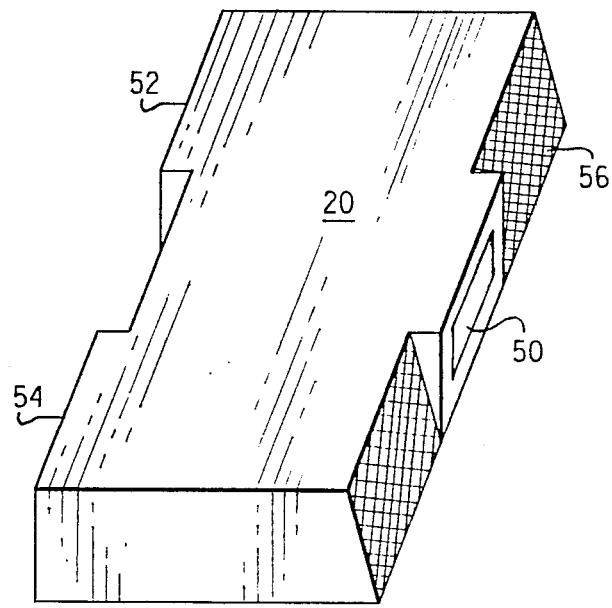
FIG. 3 illustrates the same frequency shifter as FIG. 2 but from the opposite perspective view.

FIGS. 2 and 3 illustrate one embodiment of the frequency shifter incorporating the principles of this invention. The design of this advanced frequency shifter consists of a single acousto-optic device 20 which can be tooled from Tellurium Dioxide ($TeO_2$). The shorter parallel sides serve as input/output ports for the optical beam. The longer parallel sides serve as mounts for the transducer arrays. The transducers 50, 52, 54 may be made of lithium niobate in a manner well known. One side will support an array of two transducers, while the other side will support one transducer. The transducers will have a length and height such as to ensure efficient Bragg operation. The transducers are spaced apart by a length that is slightly longer than the transducer. The transducer arrays are staggered on either side so that no transducer is directly opposite another transducer. The surfaces opposite the transducers such as 56 are canted, abrased and coated with an acoustic dampening material such as epoxy, rubber, etc., to allow the acoustic waves generated by the transducers to be scattered and absorbed. In this way, problems with reflected waves can be avoided. The input light beam enters the modulator at the Bragg angle, Beta. When the modulator is operated in the Bragg mode, the transducer on one side of the device is activated in a manner hereinbefore described to drive the acoustic wave across the crystal such that it interacts with the light beam to produce a frequency shifted beam and a zeroth order beam which is not frequency shifted. The zeroth order beam is directed into one direction of the fiber in the optical gyro loop, say counterclockwise, while the frequency shifted beam is directed into the other direction of the fiber. When the transducer array TR-1 is turned on, the clockwise beam is frequency upshifted. If the transducer array TR-2 is turned on, the clockwise beam is frequency downshifted.

An alternate embodiment of this device would be to couple the light beam into the acousto-optic modulator 20 perpendicular to its interface and slightly tilt the transducers on the surface of the modulator to achieve the Bragg condition.

The idea of using an asymmetrical number of transducers on one side of the device, as opposed to the other side, is to make the effective beamsplitting and frequency shifting occur at the same point in the modulator regardless of which transducer array is turned on, and to be able to reverse the polarity of the frequency shift. Fundamentally the device operates in an analogous fashion as a convention acousto-optic modulator. A conventional device with a single transducer element will act as a frequency shifter and beamsplitter with the deflected beam appearing to come from the midpoint along the transducer. The deflected beam is actually made up of several deflected beams, each with a different phase which is determined by where along the optical path it is deflected. At the midpoint of the transducer, the phase of the deflected light beam is zero. The phase of a deflected light beam on one side of the midpoint is canceled by the phase of the light beam on the opposite side of the midpoint. This produces a set of deflected light beams which add together and have an average phase of zero. The same argument can be used to show that the resultant deflected beam from a device with two transducer elements, which appears to come from the midpoint of the device, has an average phase of zero. As a further generalization, the same argument is used to describe the output from two frequency shifter devices separated by a distance "X". In this case the effective deflected beam acts like it originates from the point halfway between the two devices, provided each device is the same length. The frequency shifter 20 described above can be fabricated by allowing the distance "X" to increase such that a third frequency shifter can be placed in between the first two devices, but with the transducer facing in the opposite direction and fabricating all three transducer arrays on one solid tellurium dioxide crystal. The addition of the third transducer as shown in FIGS. 2 and 3 or any odd multiple or transducer elements greater than three allows the beam coupled to the clockwise direction to be switched from +F to −F when the TR-1 is turned off and TR-2 turned on.

Figures 4A, 4B:
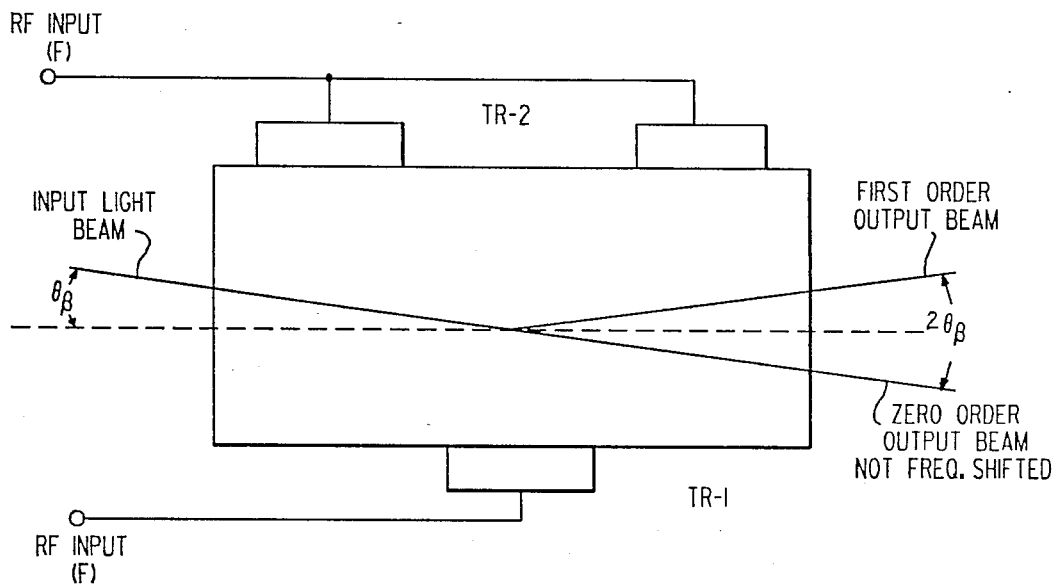
FIG. 4 illustrates how the embodiment described in FIGS. 2 and 3 is used in the Bragg mode of operation.

FIG. 4 illustrates how the embodiment described in FIGS. 2 and 3 is used in a Bragg mode of operation. A collimated light beam is inputted into the device at the Bragg angle which is defined by the frequency, F, of the r.f. input signal, the wavelength of the light beam and he velocity of the acoustic wave in the crystal medium. A portion of the input light beam is deflected into the first order output beam, while the remaining undeflected light beam becomes the zeroth order output beam. The angular separation between the zeroth order beam and the first order is twice the Bragg angle. The zeroth order beam passes through the device and does not experience a frequency shift. The first order output beam experiences a frequency shift. When the transducer array TR-1 is turned on (TR-2 is off), the resultant frequency shift is referred to as an upshift in frequency. The amount of increase in frequency is equal to the frequency of the r.f. input. When TR-2 is turned on and TR-1 is off, the first order beam is downshifted in frequency, and the amount of decrease in frequency is equal to the frequency of the r.f. input.

FIG. 5 illustrates how the embodiment described in FIGS. 2 and 3 s used in the Raman-Nath mode of operation. Typically Raman-Nath operation is achieved by fabricating a device with shorter transducer lengths and uses lower operating frequencies. The collimated light beam enters the device parallel to the acoustic wave with no angular tilt. There are three exiting light beams of interest; the zeroth order beam which is not used and is blocked or spatially filtered and two first order beams, one on each side of the zeroth order beam. When TR-1 is on and TR-2 is off, first order beam 1 is upshifted in frequency (+F) and first order beam 2 is downshifted in frequency (−F). The amount of frequency shift is equal to the frequency of the r.f. input. When TR-2 is on and TR-1 is off, first order beam 1 is downshifted (−F) and first order beam 2 is upshifted (+F). Again the amount of frequency shift is equal to the frequency of the r.f. input.

FIG. 6 shows an embodiment described in FIGS. 2 and 3, but implement with three individual acousto-optic modulators. The three devices were lined up in a serial fashion with the two outside devices having their transducers facing in the same direction while the inner device had its transducer elements facing in the opposite direction. The crystals were placed in a housing such that the outer two devices which had their transducer facing in the same direction were electrically wired in series. These devices together make what will be referred to as the dual array Ao modulator. The crystal in the middle of these two devices, referred to as the single array Ao modulator, had its transducer facing in the opposite direction.

After the frequency shifters and the tuning networks were assembled out of standard capacitors and inductors and mounted into the housing, a collimated light beam, with a wavelength of 830 nanometers, was aligned to the device at the correct Bragg orientation when the crystals are operated at 80 MHz. This alignment was done such that when the dual array transducer side was operated, the deflected beam was frequency shifted by +80 MHz. When the single transducer side was operated, the deflected beam was frequency shifted by −80 MHz. There was no measurable difference between the spatial location of the +80 MHz deflected beam and the −80 MHz deflected beam. Both deflected beams acted as if they originated from the same point which was the midpoint between the two outer crystals. The efficiency of both the dual and the single transducer arrays was measured as a function of r.f. drive power. Both the dual array and the single array had approximately the same efficiency for a given r.f. power level. Even though the dual array had twice the interaction length of the single array, the measured efficiencies were about the same. This is a result of the r.f. drive power being distributed between the two sets of transducers on the dual array side of the frequency shifter. This effect offsets the fact that the dual array has an interaction length twice as long as the single frequency shifter.

The input light beam enters the modulator at the Bragg angle, Beta. When the modulator is operated in the Bragg mode, the transducer on one side of the device is activated in a manner hereinbefore described to drive the acoustic wave across the crystal such that it interacts with the light beam to produce a frequency shifted beam and a zeroth order beam which is not frequency shifted. The zeroth order beam is directed into one direction of the fiber in the optical gyro loop, say counterclockwise, while the frequency shifted beam is directed into the other direction of the fiber. When the transducer array TR-1 is turned on, the clockwise beam is frequency upshifted. If the transducer array TR-2 is turned on, the clockwise beam is frequency downshifted.

An alternate embodiment of this device would be to couple the light beam into the acousto-optic modulator 20 perpendicular to its interface and slightly tilt the transducers on the surface of the modulator to achieve the Bragg condition.

Figure 7:
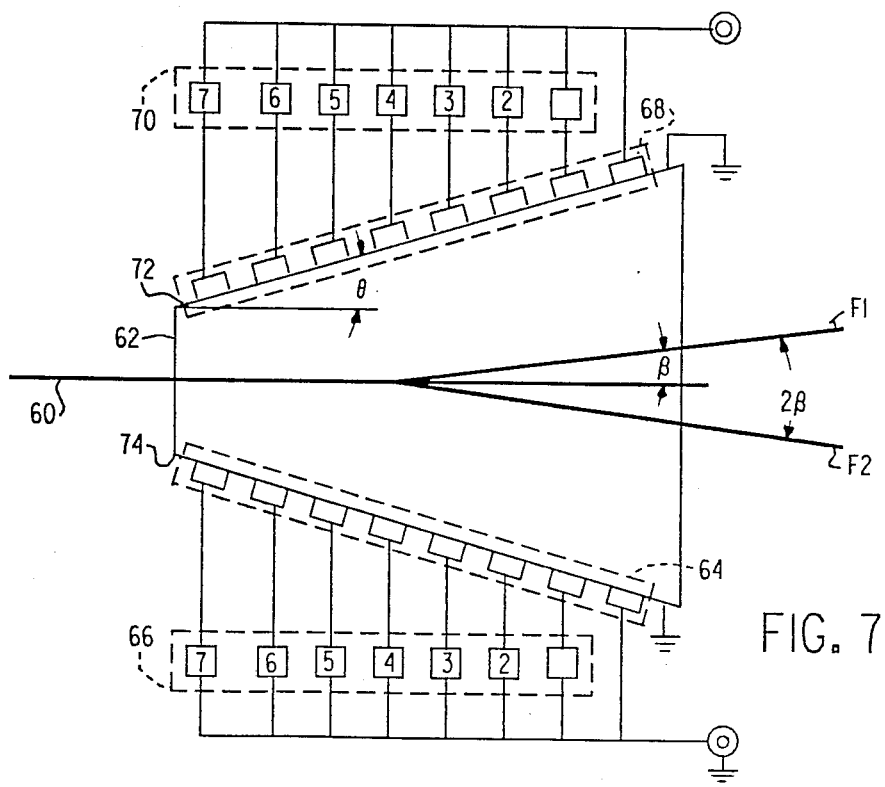
FIG. 7 illustrates an embodiment of this invention which uses acoustic wave beam steering to allow the frequency shifter to operate in the Raman-Nath mode of operation.

FIG. 7 illustrates another embodiment of the acousto-optic modulator incorporating the principles of this invention operated in the Raman-Nath mode. A collimated light beam 60 enters the frequency shifter 20 with an angle at or near perpendicular to the optical input interface 62. One of the transducer arrays such as 64 is activated by applying an r.f. signal to the time delay circuitry 66 such that the different transducer segments are driven at a time delay $\pi$ radians out of phase with its neighbor. The time delay circuitry 66 may be multi-pin dip-tapped delay lines type chips such as supplied by Datatronics, Ltd., or Data Delay Devices, Inc. This allows the acoustic waves traveling forward across the device to be steered such that it interacts with the light beam. The light beam is defracted such that a frequency upshifted component is generated at frequency F1, and a frequency downshifted component is generated at F2. When the transducer array 64 is turned off and the transducer array 68 is turned on by time delay circuitry 70, $F_1$ becomes downshifted and F2 is upshifted. The downshifted and upshifted components of the light beams are then coupled in counterpropagating directions through the fiber coil. The acousto-optic modulator 20 has nonparallel surfaces at 72 and 74 whose angles are much greater than the acoustical optic interaction angle defined by the Bragg condition for defraction. This prevents the acoustic waves traveling across the device and striking the opposite surface from back reflecting and interacting with the light beam.

Figure 8:
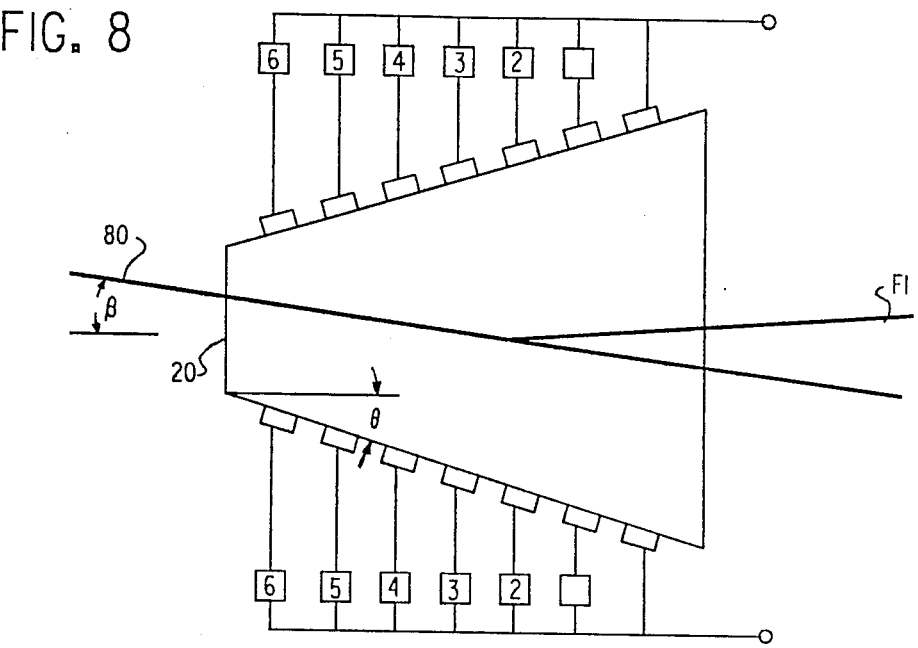
FIG. 8 illustrates the frequency shifter described in FIG. 7 being operated in the Bragg mode of operation.

FIG. 8 shows how the device is used in the Bragg mode of operation. In this case, the input beam 80 enters the frequency shifter 20 at the Bragg angle which is much less than the angle of the nonparallel surface of the device. There are only two output beams, a frequency shifted F1 beam, which can be upshifted or downshifted depending on which transducer array is being operated, and a zeroth order beam which is not frequency shifted. The zeroth order beam is directed into the counterclockwise direction of the fiber coil while the frequency shifted beam is directed into the clockwise direction.

Although there has been illustrated and described specific detail and structure of operation, it is clearly understood that the same were merely for purposes of illustration and that changes and modifications may be readily made therein by those skilled in the art without departing from the spirit and the scope of this invention.

What we claim is:

1. A fiber optic sensor, comprising:
   (a) a light source means for producing a first beam of light;
   (b) a beam splitting means for receiving the first beam of light having a polarizing means connected to one output for polarizing a portion of the first light beam;
   (c) an acousto-optic frequency shifting means connected to the polarizing means for frequency shifting and splitting the polarized portion of the first beam of light into second and third beams of light and recombining the second and third beams into a fourth beam of light;
   (d) a dual array of acoustic transducers connected to opposite sides of the acousto-optic frequency shifting means each transducer driven with a successive time delay means for directing the acoustic wave such that the direction of the acoustic wave is controllable for acousto-optic interaction between the light beam and the acoustic wave;
   (e) a polarity means connected to the dual array of acoustic transducers for changing the polarity of the frequency shift between the second and third beams;
   (f) counterpropagating means for directing the second and third beams of light received from the frequency shifting means along a light path in counterpropagating directions; and
   (g) a detection means for detecting the phase modulated frequency contained in the fourth light beam recombined at the frequency shifting means including electrical circuitry means for measuring environmental effects on the counterpropagating light beams by detecting the nonreciprocal phase shift of the counterpropagating beams.

2. A fiber optic sensor as recited in claim 1 wherein the frequency shifting means is comprised of an acousto-optic material for beamsplitting and frequency shifting a light beam inputted into one end of the material to achieve acousto-optic interaction between the light beam and the acoustic wave.

3. A fiber optic sensor as recited in claim 2 wherein the polarity means is comprised of a switching means for switching between the transducers mounted on opposite sides such that only transducers on one side operate at any instant in time.

4. A fiber optic sensor as recited in claim 3 wherein the dual array of acoustic transducers are configured for beamsplitting and frequency shifting a light beam to achieve acousto-optic interaction between the light beam and the acoustic wave in the Raman-Nath diffraction mode.

5. A fiber optic sensor as recited in claim 3 wherein the dual array of acoustic transducers are configured for beamsplitting and frequency shifting a light beam to achieve acousto-optic interaction between the light beam and the acoustic wave in the Bragg diffraction mode.

6. A fiber optic sensor as recited in claim 3 wherein the two opposite sides of the acousto-optic material having the plurality of transducers mounted thereon are sloped at an angle less than the Bragg angle of diffraction to eliminate back reflections of the acoustic wave from interaction with the light beam.

7. A fiber optic sensor as recited in claim 6 where the dual array of acoustic transducers are configured for beamsplitting and frequency shifting a light beam to achieve acousto-optic interaction between the light beam and the acoustic wave in the Raman-Nath diffraction mode.

8. A fiber optic sensor as recited in claim 6 wherein the dual array of acoustic transducers are configured for beamsplitting and frequency shifting a light beam to achieve acousto-optic interaction between the light beam and the acoustic wave in the Bragg diffraction mode.

9. An optical modulator, comprising:
   an acoustical optical material configured to receive an input light beam on a first surface;
   a plurality of piezoelectric transducers forming transducer arrays mounted on second and third opposite surfaces of the acoustic optic material generally perpendicular to the first surface receiving the input light beam; and
   an r.f. driver means and time delay circuitry means for driving the different transducers at a time delay of pi radians out of phase with adjacent transducers for steering the input light beams past the second and third surfaces and out of a fourth surface generally parallel to the first surface and perpendicular to the second and third surfaces.

10. An optical modulator as recited in claim 9 wherein the sides supporting the plurality of piezoelectric transducers are generally out of perpendicular alignment with the first side that receives the input light beam by the Bragg angle.

* * * * *